Feb. 9, 1954  R. W. KING  2,668,597
DRIVE AXLE FOR TRACTOR-IMPLEMENT COMBINATIONS
Filed May 17, 1951  3 Sheets-Sheet 1

INVENTOR.
ROBERT W. KING
BY Carlson, Pitzner,
Hubbard & Wolfe
ATTORNEYS

Feb. 9, 1954

R. W. KING 2,668,597

DRIVE AXLE FOR TRACTOR-IMPLEMENT COMBINATIONS

Filed May 17, 1951

INVENTOR.
ROBERT W. KING
BY
ATTORNEYS

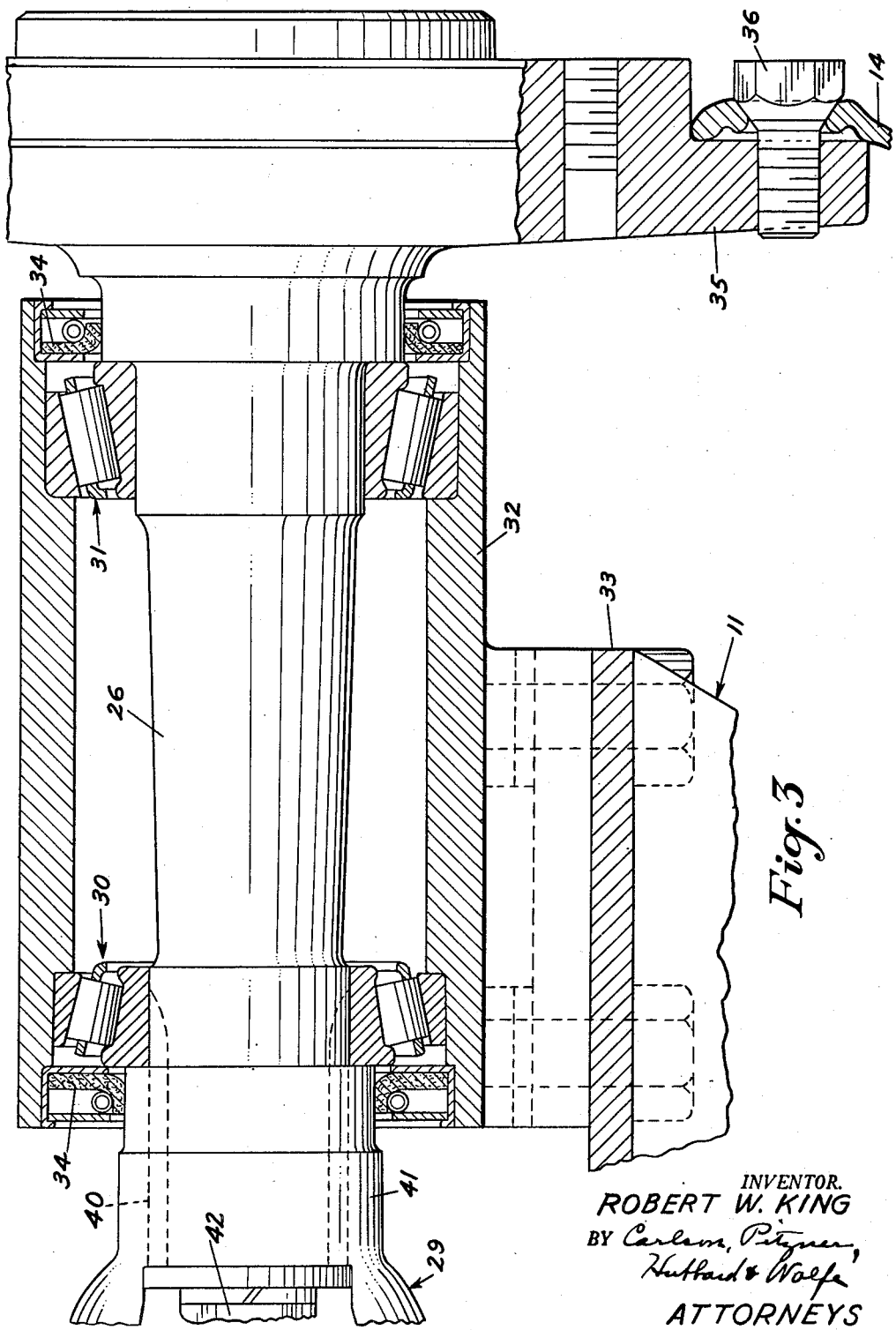

Patented Feb. 9, 1954

2,668,597

UNITED STATES PATENT OFFICE 2,668,597

DRIVE AXLE FOR TRACTOR-IMPLEMENT COMBINATIONS

Robert W. King, Birmingham, Mich., assignor to Harry Ferguson, Inc., Detroit, Mich., a corporation of Delaware Application May 17, 1951, Serial No. 226,783

3 Claims. (Cl. 180—75)

The invention relates to tractor operated implements of the type adapted to be mounted at one side of the tractor and it is more particularly concerned with an improved drive for such tractor-implement combinations.

Implements of the above general character are commonly coupled with the tractor in a semi-mounted fashion, that is so that part of the weight of the implement is carried by the tractor and the remainder by a freely rotating ground wheel on the implement at the far side from the tractor. The motive power for such tractor-implement combinations is supplied by the tractor through its rear drive wheels. As the drive wheels are connected by a differential, the tractive effort is, of course, centered on the longitudinal center line of the tractor. Consequently, in the tractor-implement combination, the drag of the implement ground wheel or the side draft of the implement as it is commonly called, exerts a turning effect on the tractor tending to swing it toward the side to which the implement is attached.

To keep the tractor-implement combination moving in a straight line, it is necessary to turn the tractor's front wheels in the opposite direction sufficiently to compensate for the side draft of the implement. The difficulty here is that the steering effect of the front wheels changes with any change in the contour of the surface on which the tractor is operated. Thus, when the tractor is moving up an incline there is less weight on the front wheels and consequently less corrective steering effect than when the tractor is operating on a flat horizontal surface. The adverse effect of this constantly changing steering effort on the operator of the tractor will be readily appreciated. Even when operating on relatively flat ground considerable physical effort is necessary to maintain a straight line of drive and this, of course, becomes increasingly difficult as the rolling character of the terrain increases until a point of instability is reached.

One general object of the present invention is to provide a drive for tractor-implement combinations which effectively eliminates the foregoing difficulties and enables the tractor-implement combination to be steered in a straight line over substantially any type of terrain and to be maneuvered on turns with the same ease that the tractor alone is steered.

Another object is to provide a novel drive for a tractor-implement combination wherein the driving function of one of the rear tractor wheels is transferred to the implement ground wheel while the tractor wheel continues to perform its normal load carrying function.

A further object is to provide a tractor-implement device of the above general character which allows the implement to float relative to the tractor so as to avoid imposing unnecessary strains on either the tractor or the implement frame when traversing rough or uneven ground.

Still another object is to provide a simple mechanism operatively associating one driving axle shaft of the tractor with the ground wheel of the implement so as to enable the tractor differential to effectively balance the driving effort of the ground wheel with the driving effort of the other tractor wheel to accord easy steering of the combination.

It is also an object of the invention to provide a simple, inexpensive mechanism by which a conventional tractor may be quickly and easily adapted for use in a tractor-implement combination wherein a balanced drive is effected through one tractor wheel and the implement ground wheel and which can be as quickly and easily changed back to adapt the tractor for use alone or with other implements.

Other objects and advantages of the invention will become apparent from the following detailed description of the preferred embodiment illustrated in the accompanying drawings, in which:

Fig. 3 is a fragmentary sectional view taken in a vertical plane on the axis of the implement ground wheel.

Fig. 4 is a fragmentary rear elevational view showing the outboard wheel drive mechanism connected for driving the tractor wheel.

Figure 1:
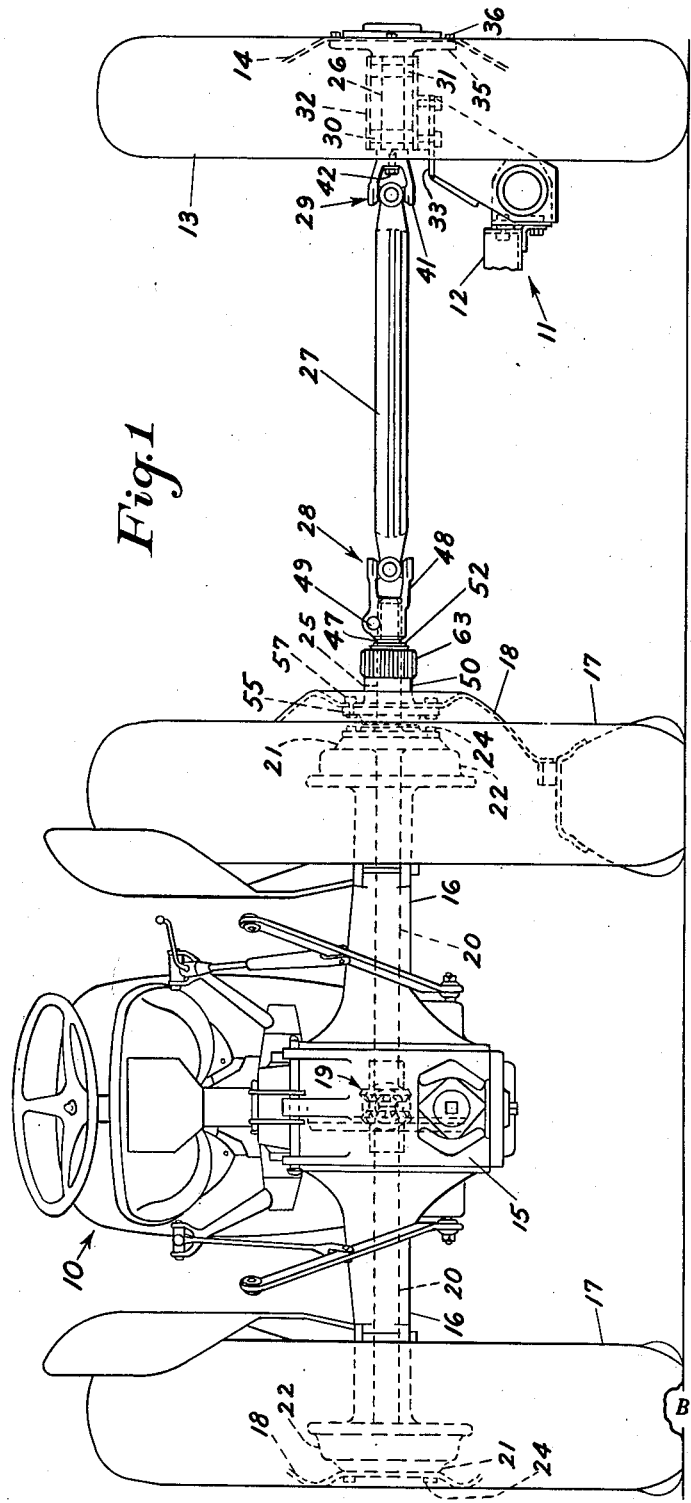
Figure 1 is a rear elevational view of a tractor and side coupled implement combination equipped with drive mechanism embodying the features of the invention.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

For purposes of illustration, the invention has been shown as applied to a conventional light-weight agricultural tractor 10 having an implement 11 coupled thereto in side-by-side relation. Only a part of the frame 12 of the implement and its ground wheel 13 have been shown, as the implement may be any one of the side mounted type which includes corn pickers, combines, field balers, forage harvesters, etc. The ground wheel 13 as shown is of the disc type comprising a stamped sheet metal disc 14 having a rim shaped to accommodate a conventional pneumatic tire.

The implement may be attached to the tractor in any suitable manner, preferably by coupling means which permits the implement to float or pivot relative to the tractor about a generally fore-and-aft axis when traversing rough or uneven ground. Coupling means particularly suitable for tractor-implement combinations of this general character are disclosed in the copending applications of Noral A. Nelson, Serial No. 218,636, filed March 31, 1951, and Herman G. Klemm and Melville J. Mitchell, Serial No. 219,798, filed April 7, 1951.

Referring to Fig. 1 of the drawings, the exemplary tractor 10 has an elongated body or center housing 15 with the usual axle housings 16 at its rear end supporting rear drive wheels 17. The wheels shown are of conventional construction each comprising a stamped metal disc 18 fitted with a drop center rim for the accommodation of a pneumatic tire.

The wheels 17 are driven from the tractor engine through a speed change transmission (not shown), a differential 19 enclosed in the central portion of the axle housing and axle shafts 20 extending from opposite sides of the differential through the axle sections of the housing. Each shaft 20 is formed at its outer end with an enlargement or flange 21 which carries a drum or brake shoe housing 22 and upon which the drive wheels 17 are normally mounted. For mounting the wheels each of the flanges 21 is provided with a series of wheel attaching studs 23 (Fig. 2) projecting axially from the outer face of the flange. These studs are usually spaced apart uniformly circumferentially of the flange and the disc portion 18 of the tractor wheel is formed with a series of similarly spaced holes for the reception of the studs. Clamping nuts 24 threaded on the projecting ends of the studs rigidly secure the wheel to the axle shaft.

In carrying out the invention, a simple, easily applied mechanism is provided for transferring the driving action of one of the axle shafts 20 to the ground wheel 13 of the implement while still retaining the supporting function of the tractor drive wheel normally driven by that axle shaft. That is to say, the tractor wheel at the implement side of the tractor is relieved of its usual driving function but remains in place to cooperate with the companion drive wheel in supporting the rear end of the tractor and a part of the weight of the attached implement. The drive for the tractor implement combination is then effected through the tractor drive wheel 17 at the side remote from the implement and the implement ground wheel 13. The differential 19 is thus enabled to equalize the driving effort of the wheels in the usual manner so that the tractor implement combination may be steered substantially as easily as the tractor alone. Moreover, the location of one of the driving wheels at the side of the implement remote from the tractor effectively eliminates side draft and enables the combination to be driven in a straight line without resorting to corrective turning of the front wheels of the tractor.

The drive mechanism is in its preferred form comprises a first stub shaft 25 (Figs. 1 and 2) adapted to be attached to the tractor axle shaft 20 in place of the wheel 17, a second stub shaft 26 (Figs. 1 and 3) adapted to be drivingly connected to the implement ground wheel 13 and a universally jointed connection between the stub shafts. The latter as shown in Fig. 1 includes an intermediate shaft 27 having a universal joint 28 at one end for connection with the stub shaft 25 and a second universal joint 29 at the other end for connection with the stub shaft 26. Thus bending stresses on the tractor axle shaft 20 are minimized when the implement pivots relative to the tractor in traversing uneven ground.

By reference to Fig. 3 of the drawing, it will be observed that the stub shaft 26 is journalled by anti-friction bearings 30 and 31 in a bearing sleeve 32 bolted to a bracket 33 rigidly attached to the implement frame 12. Sealing rings 34 at opposite ends of the sleeve serve to retain lubricant in and protect the bearings against the entry of foreign material. At its outer end the stub shaft 26 is formed with an enlargement or flange 35 shaped for cooperation with the disc 14 of the implement wheel 13. The disc may be secured to the flange in any preferred manner, as by clamping bolts 36.

At its inner end the stub shaft 26 is splined as at 40 (Fig. 3) for connection with one element 41 of the universal joint 29. A lock nut 42 threaded on an extension of the stub shaft restrains the universal joint element against movement axially of the shaft. It will be understood that the other element of the universal joint 29 constitutes a part of or is suitably secured to the intermediate shaft 27, as shown in Fig. 1.

Figure 2:
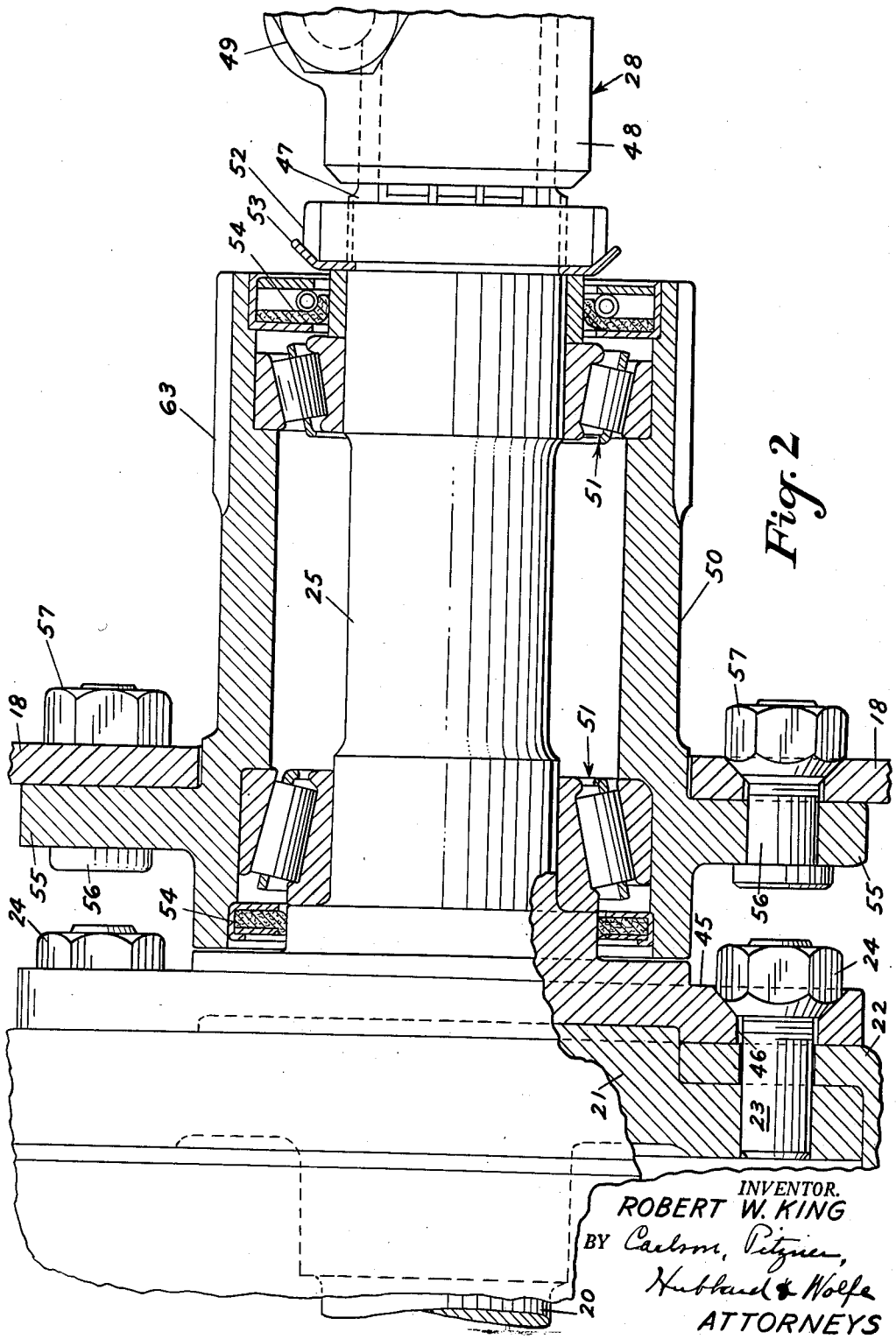
Fig. 2 is a fragmentary sectional view taken in a vertical plane on the axis of the right rear wheel of the tractor shown in Fig. 1.

Referring to Fig. 2 of the drawings, the stub shaft 25 is shaped for attachment to the outer end of the tractor axle shaft 20 in axial alinement therewith. For this purpose the stub shaft is formed at one end with an enlargement or flange 45 having a series of circumferentially spaced holes 46 arranged in a pattern corresponding to that of the wheel attaching studs 23 on the axle shaft 20. Accordingly, the stub shaft may be attached to the axle shaft in precisely the same manner that the tractor wheel 17 is normally mounted on the axle shaft.

The outer end of the stub shaft 25 is splined as at 47 for effecting a driving connection with one element 48 of the universal joint 28, which has its other element formed as a part of or secured to the adjacent end of the intermediate shaft 27. Preferably, the joint element 48 is split longitudinally at one side and fitted with a clamping bolt 49 for rigidly clamping the element to the stub shaft or releasing it for removal therefrom when the implement is to be uncoupled from the tractor.

To enable the tractor wheel 17 replaced by the stub shaft 25 to perform its supporting function without interfering with the tractor-implement combination drive, provision is made for mounting that wheel on the stub shaft for free rotation. To this end an elongated tubular sleeve member 50 is rotatably supported on the stub shaft as by anti-friction bearings 51. A lock nut 52 threaded on the outer end of the stub shaft, together with a lock washer 53 interposed between the nut and a shoulder on the shaft, holds the sleeve member against axial movement on the shaft. Sealing rings 54 are provided at each end of the sleeve member for retaining lubricant and for protecting the bearings against the entry of foreign material.

For attachment of the tractor wheel 17 the sleeve member 50 is formed intermediate its ends with an enlargement herein shown as a flange 55 carrying a series of axially projecting wheel attaching studs 56 arranged in a pattern corresponding to that of the studs 23 on the axle shaft 20. The stud bolts 56 are therefore adapted to register with and enter the holes in the wheel disc 18 which normally receive the studs 23. The wheel disc is clamped to the flange by nuts 57 threaded on the stud bolts. As the sleeve member 50 is freely rotatable on the stub shaft, the wheel 17 mounted thereon is enabled to support the tractor in the usual manner without in any way interfering with the driving action of the axle shaft 20 and the extension provided by the stub shaft 25 and associated elements.

In accordance with another aspect of the invention, provision is made for restoring the driving function to the disconnected tractor wheel 17 without requiring disconnection of the stub shaft 25 from the axle shaft so that the tractor may be used in the normal manner when the implement is uncoupled therefrom. More particularly, the invention provides coupling means for establishing a driving connection between the stub shaft 25 and the wheel carrying sleeve member 50 in lieu of the connection with the implement ground wheel. Accordingly, the conditioning of the tractor for use alone or with other implements is greatly facilitated.

Coupling means suitable for the above purpose comprises a cup shaped member 60 (Fig. 4) having at one end a bore 61 dimensioned to receive the outer end of the stub shaft 25 and internally splined for engagement with the splines 47 on the shaft. The bore 61 opens into a counterbore 62 dimensioned to fit over the end of the sleeve member 50. The counterbore is internally splined for engagement with external splines 63 (Figs. 1 and 2) formed on the outer end of the sleeve member. To facilitate attachment and detachment, the coupling member 60 may be split longitudinally down one side and provided with clamping bolts 64 for drawing the sections of the member into clamping engagement with the shaft and sleeve. The end of the member containing the counterbore 62 may also be slotted diametrically opposite the first mentioned slot and fitted with a clamping bolt 65 for drawing the sections together.

It will be evident that the drive mechanism of the invention may be applied to conventional tractors without requiring any structural modification of the latter. Thus it is only necessary to unscrew the nuts 24 and remove the tractor drive wheel 17 at the side to which the implement is to be coupled. The stub shaft 25 may then be attached to the axle shaft 20 in the same way and by the same elements normally used to attach the drive wheel. The detached drive wheel is then mounted on the sleeve member 50 carried by th stub shaft by clamping it to the flange 55 provided on the sleeve. When so mounted the wheel 17 provides the usual support for the tractor, but since the sleeve member 50 is freely rotatable on the stub shaft the wheel is relieved of its driving function.

Stub shaft 26 may be drivingly connected with the ground wheel 13 of the implement by simply clamping the wheel disc to the flange 35 provided on the stub shaft by means of the usual clamping screws 36. When the implement is coupled to the tractor the driving connection for the ground wheel is completed by engaging the universal joint element 48 over the end of the stub shaft and clamping it in place by means of the clamping bolt 49, it being understood that the other end of the intermediate shaft 27 is connected with the stub shaft 26 by the coupling 29. Accordingly, tractive effort for driving the tractor-implement combination is applied through one of the tractor wheels 17 and the implement ground wheel 13 so that side draft of the implement is completely eliminated. The combination can, therefore, be steered in a straight line without turning the front wheels of the tractor in a compensatory steering action. Moreover, the tractive effort on the two driving wheels is equalized by the tractive differential 19 operating in its normal manner so that the tractor-implement combination may be steered with substantially the same ease that the tractor alone is steered.

Since the brake drum 22 remains attached to the flange 21 of the right-hand axle shaft 20 upon installation of the outboard wheel drive mechanism, it will be evident that the tractor brake system will act on the outboard wheel 13 in precisely the same way it usually acts on the right-hand tractor wheel 17. The tractor-implement combination may therefore be brought to a stop by manual application of the tractor brakes without any tendency to twist or turn from the line of drive. Furthermore, steering on short turns is greatly facilitated as the brakes may be applied independently to the wheel at the inside of the turn whether that is the tractor wheel or the implement wheel. It is important to note that these advantages are attained without any additions to or changes in the tractor brake system.

As the tractor wheel relieved of its driving function is still retained for supporting the tractor and implement, application of excessive loads to the axle shaft of the tractor are avoided. Moreover, since the driving connection between the axle shaft and the implement ground wheel is universally jointed, the implement may pivot or float relative to the tractor as the combination traverses uneven ground. Maximum flexibility is thus obtained.

A tractor equipped for use with the improved drive mechanism may be readily reconverted for use alone or with other implements by simply uncoupling the implement and establishing a driving connection between the stub shaft 25 and the wheel carrying sleeve 50. By reason of the structural arrangement provided for this purpose such connection may be effected quickly and easily through the application of a simple coupling member 60. Thus the advantages of easy and accurate steering of the tractor implement combination are attained while still leaving the tractor readily available for other use.

I claim as my invention:

1. Drive mechanism for use with a tractor having differentially connected rear axle shafts each having an enlarged end portion fitted with a series of axially projecting threaded studs for attachment of a drive wheel, said mechanism comprising, in combination, a stub shaft having an enlargement at one end for attachment to the tractor axle by means of the studs in lieu of the tractor wheel, said stub shaft having splines at its opposite end for coupling with a shaft to be driven, means for supporting the tractor wheel for free rotation on said stub shaft comprising a sleeve having an enlargement carrying a series of axially projecting wheel attaching studs arranged in a pattern corresponding to that of the studs on said axle shaft, and anti-friction bearings supporting said sleeve on said stub shaft and restraining it against axial movement relative thereto.

2. Drive means for use with a tractor having differentially connected rear axle shafts each having an enlarged end portion fitted with a series of axially projecting threaded studs for attachment of a driving wheel, said mechanism comprising, in combination, a stub shaft having an enlargement at one end for attachment to the tractor axle by means of the studs in lieu of the tractor wheel, said stub shaft having splines at its opposite end for coupling with one of a plurality of parts to be driven, means for supporting the tractor wheel for free rotation on said stub shaft comprising a sleeve journaled on the stub shaft and formed intermediate its ends with a radially extending enlargement carrying a series of axially projecting studs arranged in a pattern corresponding to that of the studs on said axle shaft for attachment of the tractor wheel thereto, said sleeve having splines at its outer end for coupling with one of the parts with which said stub shaft is coupled.

3. Drive mechanism for use with a tractor having differentially connected rear axle shafts each having an enlarged end portion fitted with a series of axially projecting threaded studs for attachment of a drive wheel, said mechanism comprising, in combination, a stub shaft having an enlargement at one end for attachment to one of the tractor axle shafts by means of the studs thereon in lieu of the tractor wheel, a sleeve-like element rotatably mounted on said stub shaft, an enlargement intermediate the ends of said sleeve carrying a series of axially projecting wheel attaching studs arranged in a pattern corresponding to that of the studs on said axle shaft, said stub shaft being substantially longer than said sleeve element and projecting beyond the outer end of that element for coupling with a shaft to be driven, and a coupling element adapted to be removably attached to the projecting end of said stub shaft and to coact with the said sleeve element to drivingly interconnect the stub shaft with the element.

ROBERT W. KING.

References Cited in the file of this patent

UNITED STATES PATENTS

| Number | Name | Date |
|---|---|---|
| 1,142,336 | Layman | June 8, 1915 |
| 1,470,283 | Opitz | Oct. 9, 1923 |
| 1,651,642 | Stanfield | Dec. 6, 1927 |
| 2,202,345 | Johnson | May 28, 1940 |
| 2,403,397 | Rankin | July 2, 1946 |
| 2,575,466 | Paul | Nov. 20, 1951 |

FOREIGN PATENTS

| Number | Country | Date |
|---|---|---|
| 19,786 | Great Britain | Oct. 19, 1901 |